United States Patent
Parker, Sr.

(10) Patent No.: US 7,096,102 B1
(45) Date of Patent: Aug. 22, 2006

(54) MOTOR VEHICLE LICENSE PLATE WITH INTEGRAL WIRELESS TRACKING AND DATA DISSEMINATION DEVICE

(76) Inventor: Harold C. Parker, Sr., 605 B Peter Ct., Raleigh, NC (US) 27610

( * ) Notice: Subject to any disclaimer, the term of this patent is extended or adjusted under 35 U.S.C. 154(b) by 0 days.

(21) Appl. No.: 10/787,931

(22) Filed: Feb. 27, 2004

(51) Int. Cl.
*B60R 25/10* (2006.01)

(52) U.S. Cl. ...................... 701/36; 340/426.1
(58) Field of Classification Search .............. 701/1, 701/36; 342/357.07; 340/426.1, 426.18
See application file for complete search history.

(56) References Cited

U.S. PATENT DOCUMENTS

| | | |
|---|---|---|
| 4,001,822 A | 1/1977 | Sterzer |
| 5,105,179 A | 4/1992 | Smith |
| 5,196,846 A | 3/1993 | Brockelsby et al. |
| 5,579,008 A | 11/1996 | Hulderman et al. |
| 5,621,571 A | 4/1997 | Bantli et al. |
| 5,657,008 A * | 8/1997 | Bantli ................ 340/933 |
| D396,439 S | 7/1998 | Turnquest |
| 6,404,327 B1 * | 6/2002 | Naddeo ............ 340/426.11 |
| 6,876,296 B1 * | 4/2005 | Talmadge et al. .... 340/10.42 |
| 2003/0112242 A1 * | 6/2003 | Vitale et al. ........... 345/440 |
| 2003/0200227 A1 * | 10/2003 | Ressler .............. 707/104.1 |
| 2004/0189493 A1 * | 9/2004 | Estus et al. ............ 340/988 |

* cited by examiner

*Primary Examiner*—Michael J. Zanelli
(74) *Attorney, Agent, or Firm*—John D. Gugliota; Olen L. York, III

(57) ABSTRACT

An apparatus that provides for the wireless receiving, storing and dissemination of digital data as part of a motor vehicle license plate is disclosed. The apparatus allows for the querying of data typically associated with driving privileges, such as social security numbers, insurance policy information, addresses, registration information, driving records, driving restrictions and the like. Data would be passed wirelessly upon receipt of a valid request signal from a law enforcement vehicle. Such reporting is viewed as a means to reduce data entry and eliminate errors thus freeing the law enforcement officer to perform other duties, or perform multiple queries in the same time as it takes to perform one in a conventional manner. Remote inputs from alarm systems and panic buttons allow for activation of the transmitter portion to alert law enforcement authorities of a possible crime. Such emergency reporting can only be acknowledged and deactivated by authorized authorities.

10 Claims, 3 Drawing Sheets

MOTOR VEHICLE LICENSE PLATE WITH INTEGRAL WIRELESS TRACKING AND DATA DISSEMINATION DEVICE

RELATED APPLICATIONS

There are no previously filed, nor currently any co-pending applications, anywhere in the world.

BACKGROUND OF THE INVENTION

1. Field of the Invention

The present invention relates generally to wireless data transfer systems and, more particularly, to a motor vehicle license plate with integral wireless tracking and data dissemination device.

2. Description of the Related Art

Recent events in our history have reminded us how easily terrorists, criminals and others who are hiding from the law can travel about in motor vehicles. Once such people are inside the anonymity of a car or truck, they can move freely about our country with little danger of being caught. Even if they should be pulled over for a minor travel violation, they are often released without the law enforcement officer even knowing their true identity due to inadequate alerts, incompatible computer systems and often just oversight. Also, due to illegible communications, transcription errors, and the like, incorrect or incomplete license plate numbers are checked, thus allowing criminals and others to be released. Other crimes involving motor vehicles such as car-jackings, kidnaping in motor vehicles and the like are also on the rise and are almost impossible to stop other than by blind luck. Accordingly, there exists a need for a means by which license plate registrations, driver's license information, vehicle status and the like can be queried, accessed and verified without the time-consuming effort and error-prone processes afforded by current methods.

A search of the prior art did not disclose any patents that read directly on the claims of the instant invention; however, the following references were considered related:

U.S. Patent No. Des. 396,439, issued in the name of Turnquest, discloses an ornamental design for an auto license plate lock box system;

U.S. Pat. No. 4,001,822, issued in the name of Sterzer, discloses an electronic license plate for motor vehicles;

U.S. Pat. No. 5,105,179, issued in the name of Smith, discloses an electronic display license plate;

U.S. Pat. No. 5,196,846, issued in the name of Brockelsby et al., discloses a moving vehicle identification system;

U.S. Pat. No. 5,579,008, issued in the name of Hulderman et al., discloses an electronic license plate apparatus and method; and U.S. Pat. No. 5,621,571, issued in the name of Bantli et al., discloses an integrated retro-reflective electronic display.

Consequently, there exists a continuous need for new ideas and enhancements for existing products in the electronic tracking and database transmission industry.

SUMMARY OF THE INVENTION

It is therefore an object of the present invention to provide an integral wireless tracking and data dissemination device for a motor vehicle comprising a license plate affixed to the motor vehicle.

An apparatus that provides for the wireless receiving, storing and dissemination of digital data as part of a motor vehicle license plate is disclosed. The apparatus allows for the querying of data typically associated with driving privileges, such as social security numbers, insurance policy information, addresses, registration information, driving records, driving restrictions and the like. Data would be passed wirelessly upon receipt of a valid request signal from a law enforcement vehicle. Such reporting is viewed as a means to reduce data entry and eliminate errors thus freeing the law enforcement officer to perform other duties, or perform multiple queries in the same time as it takes to perform one in a conventional manner. Remote inputs from alarm systems and panic buttons allow for activation of the transmitter portion to alert law enforcement authorities of a possible crime. Such emergency reporting can only be acknowledged and deactivated by authorized authorities.

It is a feature of the present invention to provide an integral wireless tracking and data dissemination device for a motor vehicle comprising a license plate including a legacy system of vehicle identification including a license plate number and at least one registration sticker location; a strip antenna projecting from the plate, the strip antenna receiving and transmitting digital information via a radio frequency signal; an enclosure at an upper rear portion of the plate, the enclosure housing associated circuitry of the plate; an interface cable operatively coupling the enclosure to an electrical supply system of the motor vehicle; and a querying antenna provided on at least one law enforcement vehicle, the querying antenna producing a complimentary radio frequency signal interacting with the strip antenna so as to receive and transmit digital information therebetween; wherein the device provides enhanced efficiency of law enforcement queries.

It is a further feature of the present invention to provide an integral wireless tracking and data dissemination device for a motor vehicle comprising a license plate affixed to the motor vehicle, wherein operative coupling between the enclosure and the electrical supply system of the motor vehicle comprises a battery providing a source of electrical power; an overcurrent protective device, wherein the battery is routed through the overcurrent protective device and subsequently routed through a conductor of the interface cable to the enclosure; an emergency notification signal routed from an anti-theft alarm system or a panic alarm in a parallel series through the enclosure; the enclosure comprising a power supply operatively coupled to a controller, an alarm module, a transmitter, a receiver, a multiplexer and a memory block, wherein generated power bus signals are routed from the power supply to the alarm module, the transmitter, the receiver and the controller.

It is a further feature of the present invention to provide an integral wireless tracking and data dissemination device for a motor vehicle comprising a license plate affixed to the motor vehicle, wherein the controller is operatively coupled between the power supply and the alarm module, the transmitter and the receiver, the controller further coupled to the memory block, and wherein the transmitter is further coupled to the multiplexer, the multiplexer interacting with the strip antenna for transmitting and receiving digital information, and the multiplexer transmits received digital information to the controller.

It is a further feature of the present invention to provide an integral wireless tracking and data dissemination device for a motor vehicle comprising a license plate affixed to the motor vehicle, wherein said emergency notification signal is further routed through said enclosure to said alarm module that is directly coupled to said transmitter.

It is a further feature of the present invention to provide an integral wireless tracking and data dissemination device for a motor vehicle comprising a license plate affixed to the motor vehicle, wherein said memory block stores digital information of said motor vehicle and owner thereof.

It is a further feature of the present invention to provide an integral wireless tracking and data dissemination device for a motor vehicle comprising a license plate affixed to the motor vehicle, wherein said emergency notification signal is transmitted from said motor vehicle to at least one of said law enforcement vehicle.

It is a further feature of the present invention to provide an integral wireless tracking and data dissemination device for a motor vehicle comprising a license plate affixed to the motor vehicle, wherein said emergency notification signal is latched by said plate and reset only by a proper disarming signal incoming from said querying antenna.

It is a further feature of the present invention to provide an integral wireless tracking and data dissemination device for a motor vehicle comprising a license plate affixed to the motor vehicle, wherein said emergency notification signal comprises closure of an anti-theft contact integrally coupled with said anti-theft alarm system and actuated upon unauthorized tampering with said motor vehicle.

It is a further feature of the present invention to provide an integral wireless tracking and data dissemination device for a motor vehicle comprising a license plate affixed to the motor vehicle, wherein said emergency notification signal comprises closure of a panic contact integrally coupled with a panic button and actuated upon a vehicle occupant depressing said panic button.

It is a feature of the present invention to provide an integral wireless tracking and data dissemination device for a motor vehicle comprising a license plate affixed to the motor vehicle, wherein said panic button is provided in a passenger compartment of said motor vehicle.

It is a further feature of the present invention to provide an integral wireless tracking and data dissemination device for a motor vehicle comprising a license plate affixed to the motor vehicle, wherein said panic button is provided in a trunk compartment of said motor vehicle.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
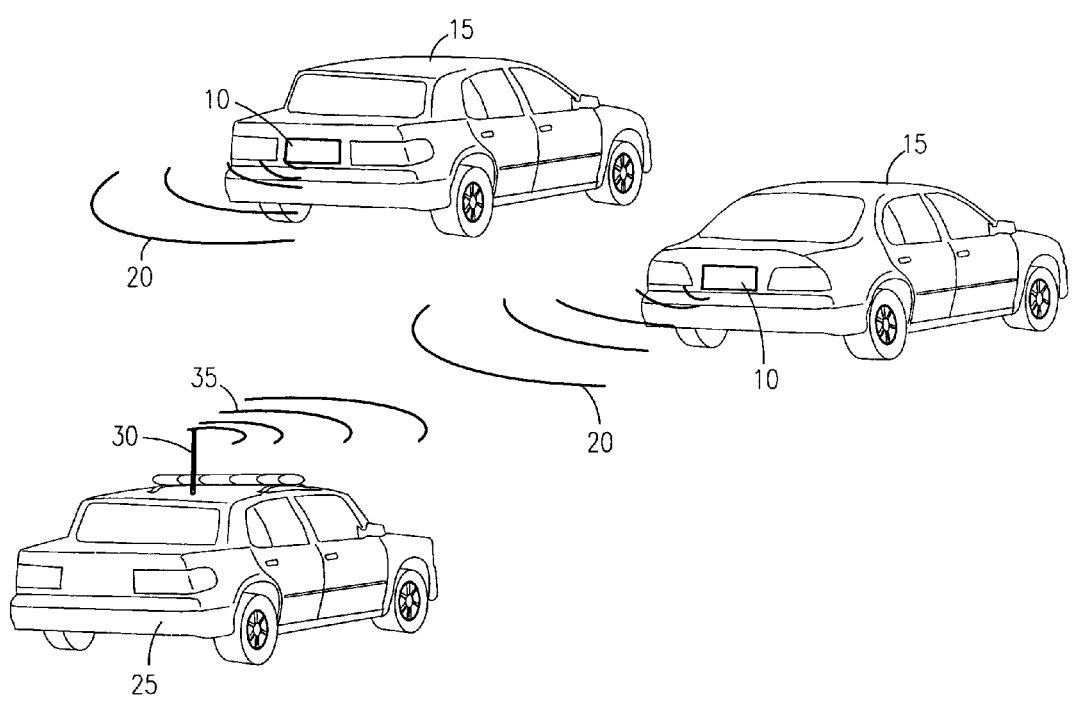
FIG. 1 is an overall perspective view of the motor vehicle license plate with integral wireless tracking and data dissemination device 10 according to a preferred embodiment of the present invention.

The best mode for carrying out the invention is presented in terms of its preferred embodiment, herein depicted within FIGS. 1 through 4.

DESCRIPTIVE KEY

- 10 motor vehicle license plate with integral wireless tracking and data dissemination device
- 15 equipped motor vehicle
- 20 radio frequency signal
- 25 law enforcement vehicle
- 30 querying antenna
- 35 complimentary radio frequency signal
- 40 base structure
- 45 license plate number
- 50 mounting holes
- 55 registration update sticker locations
- 60 interface cable
- 65 electronics enclosure
- 70 strip antenna
- 72 access hole
- 75 battery
- 80 overcurrent protective device
- 85 emergency notification signal
- 90 anti-theft contact closure
- 95 panic alarm
- 100 power supply
- 105 alarm module
- 110 direct connection
- 115 transmitter
- 120 multiplexer
- 125 receiver
- 130 controller
- 135 memory block
- 140 power bus signals
- 145 first functional block
- 150 first operational block
- 155 second operational block
- 160 second functional block
- 165 third operational block
- 170 third functional block
- 175 fourth functional block
- 180 fifth functional block
- 185 fourth operational block
- 190 sixth functional block 1. Detailed Description of the Figures Referring to FIG. 1, an overall perspective of the motor vehicle license plate with integral wireless tracking and data dissemination device 10, according to a preferred embodiment of the present invention is disclosed. A plurality of equipped motor vehicles 15 such as automobiles, trucks, busses, vans, or the like, are situated in a real world driving environment as would be found on everyday streets, roads, highways, parking lots, and the like. The motor vehicle license plate with integral wireless tracking and data dissemination device 10 as provided on the equipped motor vehicle 15 is capable of producing and receiving a radio frequency signal 20, which would be of the frequency, protocol, and power level as approved by governing bodies and is envisioned to be of the digital packet variety to allow for simultaneous and error-proof transmission. One possible frequency of use could be 9 MHZ. A law enforcement vehicle 25 envisioned to be a municipal police officer, state officer, or a federal officer, is equipped with a querying antenna 30 which produces a complimentary radio frequency signal 35, which interacts with the motor vehicle license plate with integral wireless tracking and data dissemination device 10 on the equipped motor vehicle 15. It is envisioned that such data as social security numbers, insurance policy information, addresses, registration information, driving records, driving restrictions and the like, would be stored and processed by the motor vehicle license plate with integral wireless tracking and data dissemination device 10, but is not intended as a limiting factor of the present invention. Due to the digital nature of the information being passed on the radio frequency signal 20 and the complimentary radio frequency signal 35, any digital file such as photographs, sound files, text files and the like could be stored and transmitted. Such information would result in faster vehicle registration checks which not only frees the law enforcement officer up faster for more important duties, but results in less data entry mistakes, and allows the officer to perform more random registration checks, which may permit the apprehension of more criminals and others hiding from the law. Said apprehensions would result in not only a more safe environment for all, but would be an important benefit for homeland and/or world security.

Figure 2:
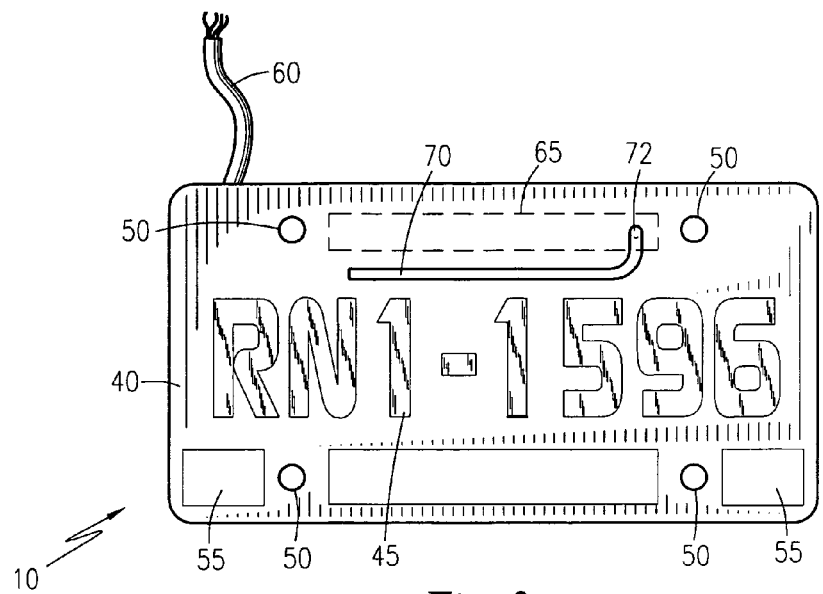
FIG. 2 is a detailed perspective view of the motor vehicle license plate with integral wireless tracking and data dissemination device 10, according to a preferred embodiment of the present invention.

Referring now to FIG. 2, a detailed perspective view of the motor vehicle license plate with integral wireless tracking and data dissemination device 10 according to a preferred embodiment of the present invention, is disclosed. A base structure 40, envisioned to be manufactured from sheet metal, provides the outward appearance of a conventional license plate. A license plate number 45 is provided in the center of the base structure 40 for use in visual observation in the conventional manner. The base structure 40 is held in place on the equipped motor vehicle 15 (as seen in FIG. 1) by a series of four mounting holes 50, which are spaced and located to match the typical mounting requirements of a conventional license plate. A series of registration update sticker locations 55 are located along the bottom of the base structure 40 to allow for visual indication of yearly registration updates. Such features provided by the base structure 40, the license plate number 45, the mounting holes 50 and the registration update sticker locations 55 are those typically afforded conventional license plates and as such, allow the motor vehicle license plate with integral wireless tracking and data dissemination device 10 to enhance such features in lieu of replacing them, allowing legacy systems which rely of the features of a conventional license plate to remain in service. An interface cable 60 is provided to connect to the electrical supply system of the equipped motor vehicle 15 and provide input signals, which will be shown in greater detail herein below. An electronics enclosure 65 is located on a rear upper section of the base structure 40 (shown via phantom lines, for purposes of illustration) which houses the associated circuitry of the motor vehicle license plate with integral wireless tracking and data dissemination device 10, which will be shown in greater detail herein below. Finally, a strip antenna 70 is shown on the surface of the base structure 40 which allows the strip antenna 70 to receive and transmit the necessary data. The strip antenna 70 is routed through an access hole 72 thus allowing exterior access to the strip antenna 70.

Figure 3:
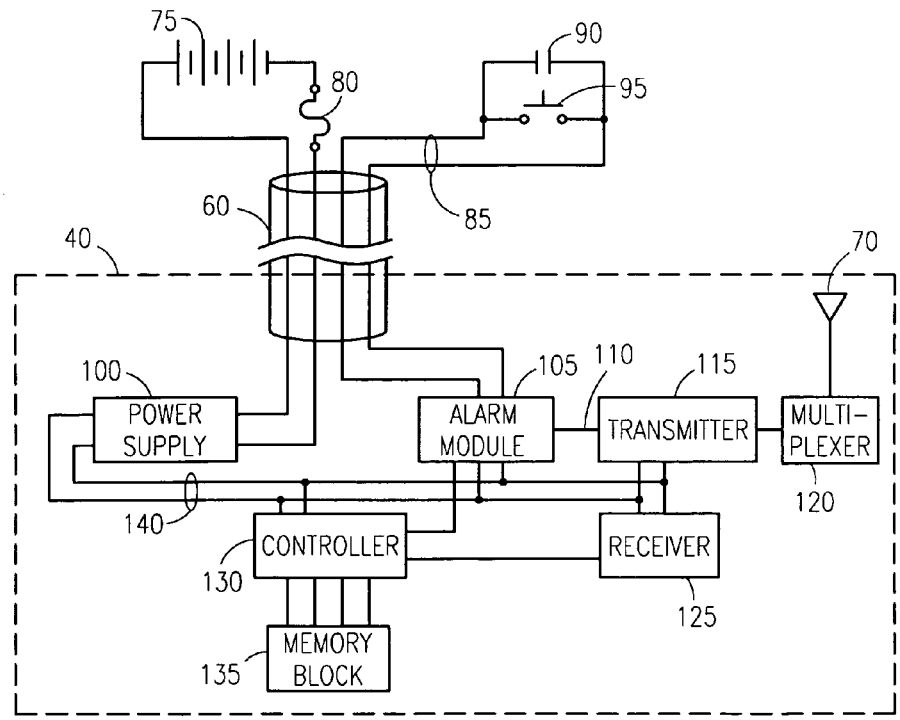
FIG. 3 is a functional interconnection diagram of the motor vehicle license plate with integral wireless tracking and data dissemination device 10.

Referring next to FIG. 3, a functional interconnection diagram of the motor vehicle license plate with integral wireless tracking and data dissemination device 10, according to a preferred embodiment of the present invention, is depicted. Electrical power from a battery 75 is routed through an overcurrent protective device 80, such as a fuse, and then routed on a conductor of the interface cable 60 to the base structure 40. An emergency notification signal 85 is routed from an anti-theft contact closure 90 and a panic alarm 95 in a parallel arrangement. The anti-theft contact closure 90 would present a contact closure in the event of a theft and would be provided from an anti-theft system or alarm, which is well known in the art. The panic alarm 95 would be located in the passenger compartment of the equipped motor vehicle 15 (as shown in FIG. 1) or the trunk if so equipped. In the event of a car jacking or kidnaping, the authorized user or occupant of the equipped motor vehicle 15 (as shown in FIG. 1) would activate the panic alarm 95 by pressing alarm 95. The resultant emergency notification signal 85 would be processed by the base structure 40 as an emergency condition and broadcast to any law enforcement vehicle 25 (as shown in FIG. 1) passing by. The signals provided by the anti-theft contact closure 90 and panic alarm 95 are latched by the base structure 40 and could only be reset from a proper incoming signal from the querying antenna 30 (as shown in FIG. 1). The electrical power from the battery 75 is routed to a power supply 100 on the base structure 40. The emergency notification signal 85 is routed to an alarm module 105 which has a direct connection 110 to a transmitter 115. In such a manner, an emergency signal can be emitted regardless of the operating state of the motor vehicle license plate with integral wireless tracking and data dissemination device 10, as the direct connection 110 will take priority. The transmitter 115 is connected to a multiplexer 120 which is then connected to the strip antenna 70. The multiplexer 120 allows the strip antenna 70 to perform both transmitting and receiving operations. As such, the multiplexer 120 also provides an electrical connection to a receiver 125 which passes any received data onto a controller 130, which is envisioned to be a computer controlled device. The controller 130 has access to a memory block 135 which holds the required digital data such as, but not limited to, social security numbers, insurance policy information, addresses, registration information, driving records, driving restrictions and the like. The power bus signals 140 are routed from the power supply 100 to the alarm module 105, the transmitter 115, the receiver 125, and the controller 130.

Figure 4:
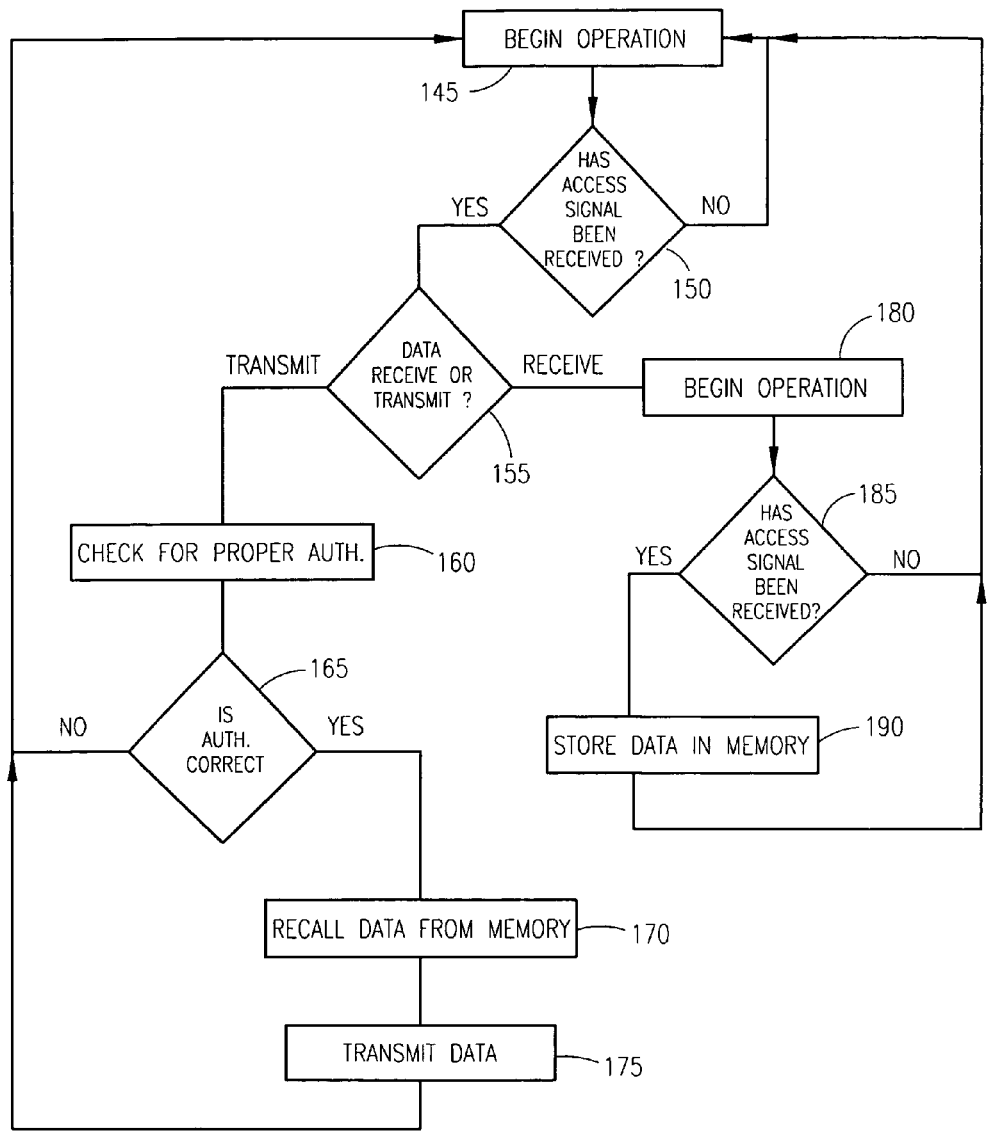
FIG. 4 is a functional logic diagram of the logic sequence as used with the data acquisition and dissemination portion of the motor vehicle license plate with integral wireless tracking and data dissemination device 10.

Referring finally to FIG. 4, a functional logic diagram of the logic sequence as used with the data acquisition and dissemination portion of the motor vehicle license plate with integral wireless tracking and data dissemination device 10 is disclosed. As the emergency reporting and tracking features of the motor vehicle license plate with integral wireless tracking and data dissemination device 10 provided by the emergency notification signal 85 as aforementioned described in FIG. 3 take priority over the data acquisition and dissemination portion features, they are not included in this logic sequence. The logic begins at a first functional block 145 whereupon the motor vehicle license plate with integral wireless tracking and data dissemination device 10 is activated. Such access continues in response to a negative result at a first operational block 150. In the event of a positive response at the first operational block 150, the motor vehicle license plate with integral wireless tracking and data dissemination device 10 must determine if the incoming signal is a request for data from the motor vehicle license plate with integral wireless tracking and data dissemination device 10 or a request to add or update data already stored in the motor vehicle license plate with integral wireless tracking and data dissemination device 10, as indicated by the second operational block 155. In the event that it is a request for data, control will proceed to a second functional block 160 where the request will be authenticated. This step will eliminate the possibility of hacking or other unauthorized access. The authentication process is performed at a third operational block 165 where a negative or unauthorized request will turn control over to the first functional block 145. A positive or authorized request will recall the requested data from memory at a third functional block 170 and transmit it at a fourth functional block 175. In the event that a request is made at the second operational block 155 to receive data, such as when updating driving records, addresses, insurance policies and the like, control would be passed to a fifth functional block 180 where verification of proper authority to change said data would be made at a fourth operational block 185. In the case of a negative response or improper authority, control reverts to the first functional block 145. In the case of positive or proper authority, the subject data would be stored in the memory block 135 (as shown in FIG. 3) as depicted via a sixth functional block 190.

It is envisioned that other styles and configurations of the present invention can be easily incorporated into the teachings of the present invention, and only one particular configuration shall be shown and described for purposes of clarity and disclosure and not by way of limitation of scope.

2. Operation of the Preferred Embodiment

The preferred embodiment of the present invention can be utilized by the common user in a simple and effortless manner with little or no training. The features and benefits of the motor vehicle license plate with integral wireless tracking and data dissemination device 10 are transparent to the normal owner and/or user of the equipped motor vehicle 15. After purchase or distribution of the motor vehicle license plate with integral wireless tracking and data dissemination device 10 is made, it must be connected to the power supply of the vehicle as depicted in FIG. 3. Additionally, optional connections to an anti-theft contact closure 90 or panic alarm 95 can be made, but are not required for operation. After initial programming of the motor vehicle license plate with integral wireless tracking and data dissemination device 10 via a querying antenna 30, the motor vehicle license plate with integral wireless tracking and data dissemination device 10 is ready for use.

To use the present invention, any law enforcement vehicle 25 with the necessary querying antenna 30 could query any equipped motor vehicle 15 at any time. Such querying would be the result of a legitimate traffic stop, or of a random nature should the law enforcement vehicle 25 be looking for invalid registrations, illegal aliens, outdated insurance policies or the like. Additionally, the emergency reporting features of the invention afforded by the connection to the anti-theft contact closure 90 and the panic alarm 95 allows for the broadcast of a crime in progress and would allow the tracking of the subject equipped motor vehicle 15 via standard and well known tracking procedures. Should such an event take place, the querying antenna 30 on the law enforcement vehicle 25 would provide for the resetting of the motor vehicle license plate with integral wireless tracking and data dissemination device 10 to allow for continued use as before.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. An integral wireless data dissemination device for a motor vehicle comprising a license plate affixed to said motor vehicle in combination with a remote querrying antenna wherein said combination comprises:
   a legacy system of vehicle identification including a license plate number and at least one registration sticker location;
   a strip antenna projecting from said plate, said strip antenna receiving and transmitting digital information via a radio frequency signal;
   an enclosure at an upper rear portion of said plate, said enclosure housing associated circuitry of said plate;
   an interface cable operatively coupling said enclosure to an electrical supply system of said motor vehicle wherein operative coupling between said enclosure and said electrical supply system of said motor vehicle comprises:
   a battery providing a source of electrical power;
   an overcurrent protective device, wherein said battery is routed through said overcurrent protective device and subsequently routed through a conductor of said interface cable to said enclosure;
   an emergency notification signal routed from an anti-theft alarm system or a panic alarm in a parallel series through said enclosure;
   said enclosure comprising a power supply operatively coupled to a controller, an alarm module, a transmitter, a receiver, a multiplexer and a memory block, wherein generated power bus signals are routed from said power supply to said alarm module, said transmitter, said receiver and said controller; and
   a querying antenna provided on at least one law enforcement vehicle, said querying antenna producing a complimentary radio frequency signal interacting with said strip antenna so as to receive and transmit digital information therebetween;
   wherein said device provides enhanced efficiency of law enforcement queries.

2. The integral wireless data dissemination device for a motor vehicle comprising a license plate affixed to said motor vehicle in combination with a remote querrying antenna of claim 1, wherein said controller is operatively coupled between said power supply and said alarm module, said transmitter and said receiver, said controller further coupled to said memory block, and wherein said transmitter is further coupled to said multiplexer, said multiplexer interacting with said strip antenna for transmitting and receiving digital information, and said multiplexer transmits received digital information to said controller.

3. The integral wireless data dissemination device for a motor vehicle comprising a license plate affixed to said motor vehicle in combination with a remote querrying antenna of claim 1, wherein said emergency notification signal is further routed through said enclosure to said alarm module that is directly coupled to said transmitter.

4. The integral wireless data dissemination device for a motor vehicle comprising a license plate affixed to said motor vehicle in combination with a remote querrying antenna of claim 1, wherein said memory block stores digital information of said motor vehicle and owner thereof.

5. The integral wireless data dissemination device for a motor vehicle comprising a license plate affixed to said motor vehicle in combination with a remote querrying antenna of claim 1, wherein said emergency notification signal is transmitted from said motor vehicle to at least one of said law enforcement vehicle.

6. The integral wireless data dissemination device for a motor vehicle comprising a license plate affixed to said motor vehicle in combination with a remote querrying antenna of claim 1, wherein said emergency notification signal is latched by said plate and reset only by a proper disarming signal incoming from said querying antenna.

7. The integral wireless data dissemination device for a motor vehicle comprising a license plate affixed to said motor vehicle in combination with a remote querrying antenna of claim 6, wherein said emergency notification signal comprises closure of an anti-theft contact integrally coupled with said anti-theft alarm system and actuated upon unauthorized tampering with said motor vehicle.

8. The integral wireless data dissemination device for a motor vehicle comprising a license plate affixed to said motor vehicle in combination with a remote querrying antenna of claim 6, wherein said emergency notification signal comprises closure of a panic contact integrally coupled with a panic button and actuated upon a vehicle occupant depressing said panic button.

9. The integral wireless data dissemination device for a motor vehicle comprising a license plate affixed to said motor vehicle in combination with a remote querrying antenna of claim 8, wherein said panic button is provided in a passenger compartment of said motor vehicle.

10. The integral wireless data dissemination device for a motor vehicle comprising a license plate affixed to said motor vehicle in combination with a remote querrying antenna of claim 8, wherein said panic button is provided in a trunk compartment of said motor vehicle.

* * * * *